United States Patent Office 3,491,545
Patented Jan. 27, 1970

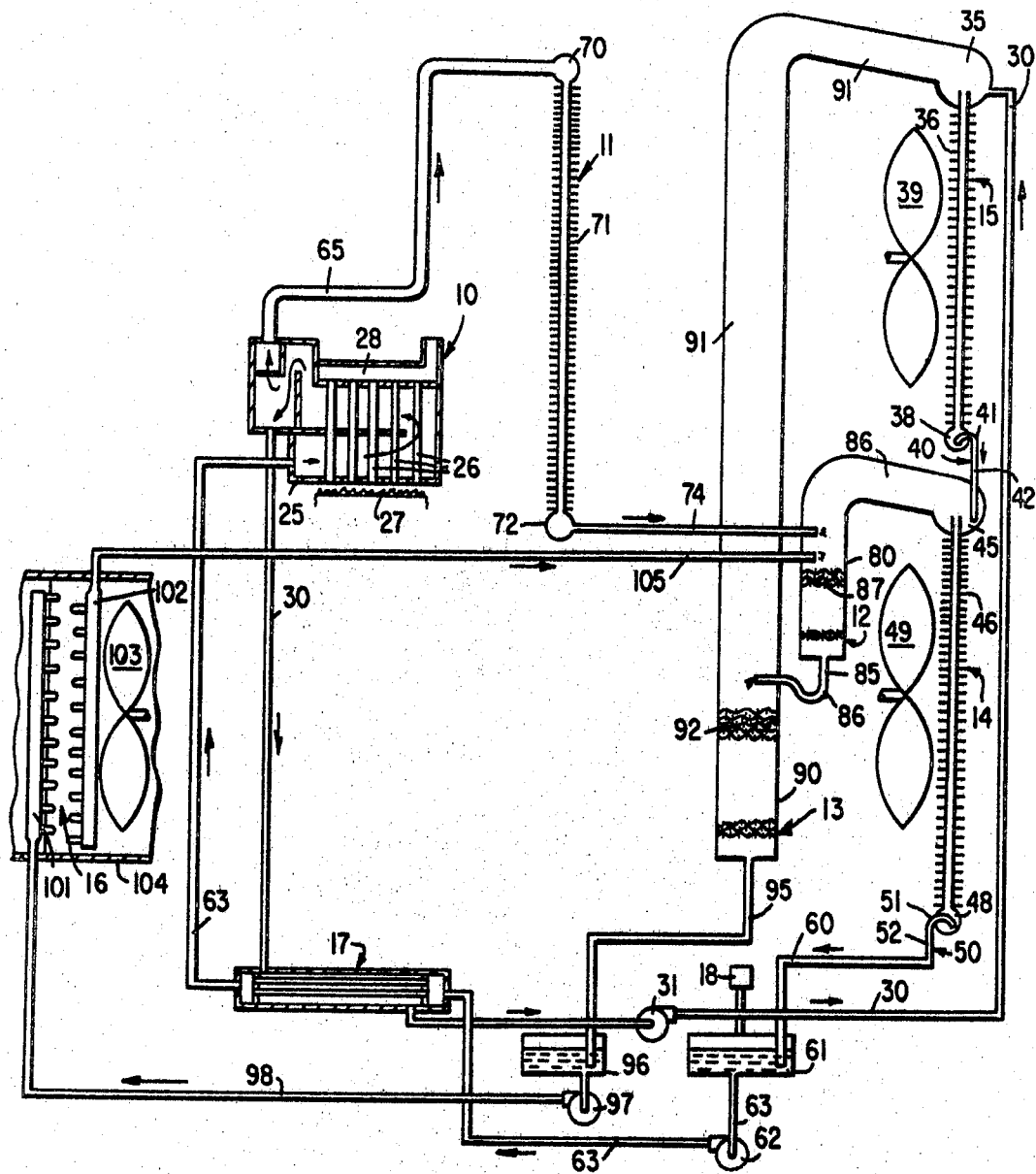

3,491,545
ABSORPTION REFRIGERATION SYSTEM
Louis H. Leonard, Jr., 202 Ridgecrest Road,
Dewitt, N.Y. 14728
Filed July 30, 1968, Ser. No. 748,874
Int. Cl. F25b *15/06*
U.S. Cl. 62—101                           15 Claims

ABSTRACT OF THE DISCLOSURE

An absorption refrigeration system employing a pair of staged air-cooled absorbers and a pair of staged adiabatic evaporators. Strong solution from the generator passes first to the low temperature absorber from which it flows through the high temeprature absorber back to the generator. Refrigerant liquid is flash-cooled in the high temperature adiabatic evaporator stage from which it passes to the low temperature adiabatic evaporator for further flash-cooling and from which it is passed through a refrigerant heat exchanger for cooling a refrigeration load and back to the high temperature adiabatic evaporator.

BACKGROUND OF THE INVENTION

Absorption refrigeration machines employing a water-cooled absorber and refrigerant condenser and utilizing a solution of lithium bromide as an absorbent and water as a refrigerant have proved highly successful. Lithium bromide is an inexpensive, non-toxic salt; water is an inexpensive refrigerant having a high latent heat of evaporation in comparison to its weight and, because of their difference in vapor pressure, the refrigerant and the absorbent can be easily separated in a generator operating at a relatively low temperature and pressure difference, compared to the absorber and evaporator. However, it has been generally recognized that the many advantages of lithium bromide-water systems are largely limited to water-cooled absorption machines and that this system is not readily applicable to air-cooled applications.

One of the principal problems involved when making a commercially feasible air-cooled refrigeration system is that the absorber temperature, which can be achieved in an air-cooled application, is substantially higher (on the order of 125° F.) than the absorber temperatures which can be utilized in a typical water-cooled machine. Since the vapor pressure of the lithium bromide solution is a direct function of temperature for a given concentration, a more concentrated absorbent solution must be used, in a high temperature air-cooled single stage absorber, to achieve a desirably low evaporator temperature, than is necessary in a water-cooled machine. Unfortunately, however, the highly concentrated lithium bromide solution required in an air-cooled absorber at a high outdoor ambient condition is dangerously close to the crystallization point. A drop in outdoor ambient temperature or even discontinuing operation of the refrigeration machine may cause solidification of the highly concentrated absorbent solution, requiring elaborate procedures for desolidifying the machine before it can again be put in service.

Higher temperatures required to concentrate the absorbent in the generator present an additional corrosion problem. If a more dilute concentration of the absorbent solution is used which will not solidify under normal operating conditions, the resulting higher absorber vapor pressure is insufficient to give a low enough evaporator temperature to provide both the dehumidification and cooling required for air conditioning.

It has been proposed to partially overcome these problems by using direct expansion evaporators for directly cooling the air to be conditioned, thus reducing the heat exchanger losses such as shown in United States Patent No. 3,273,350 for example. Such systems necessitate operating the evaporator at a higher temperature than desirable for proper dehumidification or employing excessively concentrated absorbent solution in order to achieve reasonable efficiency. Absorption refrigeration systems employing direct expansion evaporators for air cooling also have numerous other disadvantages. The evaporator must be located as an integral part of the refrigeration equipment because extended vapor passages between the evaporator and absorber can not be tolerated. Furthermore the refrigerant vapor passages from a direct expansion evaporator are complex and expensive because of the large volume of refrigerant vapor produced which necessitates providing many vapor outlet passages from the interior of the evaporator. Likewise, excess heat transfer surface must be provided in the evaporator to insure that none of the refrigerant leaves the evaporator in a liquid state, because such liquid would dilute the absorbent in the absorber. Dilution of solution in the absorber greatly increases the operating cost and limits the capacity and efficiency of this system by limiting the amount of refrigerant vapor which can be absorbed in the absorber and by using up refrigerant without producing any refrigeration from it. The increased heat transfer surface which is required also undesirably increases the cost of the refrigeration machine.

It is undesirable to make the refrigerant evaporator physically large, because a portion of the evaporator will be too warm to cool the air passing through it to provide adequate dehumidification.

Consequently, it has long been felt that some other absorbent-refrigerant combination, such as water-ammonia, must be used in an air-cooled absorption machine, even though the use of such other combinations have generally increased the complexity of the system. Direct expansion refrigerant evaporators have additional inherent disadvantages in a refrigeration system which is called upon to provide heating because of the possibility of condensing the heating medium on the condenser and absorber surfaces at temperatures below the freezing point, causing damage to the heat transfer surface.

SUMMARY OF THE INVENTION

In accordance with this invention, there is provided an air-cooled absorption refrigeration machine having multiple evaporator and absorber stages. The evaporator stages are of the adiabatic live brine type wherein about one percent of the refrigerant is evaporated to flash-cool the remaining refrigerant without heat exchange with the refrigeration load. The refrigerant successively passes from the high temperature to the low temperature evaporator stages from which the cold liquid refrigerant is circulated through a refrigerant heat exchanger to sensibly cool the refrigeration load. The liquid refrigerant is then returned to the high temperature refrigerant evapoator for recooling. The strong absorbent solution is passed directly to the low temperature absorber from which it is successively passed to the high temperature absorber stages. By this means, the temperature in the low temperature evaporator is established by the vapor pressure to which the strongest solution in the system can be air cooled, without having to concentrate the absorbent solution to a degree which might result in solidification under low ambient conditions.

BRIEF DESCRIPTION OF THE DRAWING

The drawing is a schematic flow diagram, partially in cross section, of an absorption refrigeration system having staged air-cooled absorbers and staged adiabatic evaprators connected with a refrigerant heat exchanger in accordance with this invention.

DESCRIPTION OF PREFERRED EMBODIMENT

In accordance with a preferred embodiment of this invention, there is provided an absorption refrigeration system which utilizes water as a refrigerant and an aqueous solution of lithium bromide as an absorbent. A suitable additive, such as octyl alcohol (2-ethyl-n-hexanol) or heat transfer promotion, and suitable corrosion inhibitors may be added to the solution.

"Strong solution" as referred to herein, is a concentrated solution of lithium bromide, which is strong in absorbing power, and for example may be about 64.5% lithium bromide by weight. "Weak solution" is a dilute solution of lithium bromide which is weak in absorbing power, and may be about 59.9% lithium bromide. "Intermediate solution" refers to solution intermediate in absorbing power and concentration between strong and weak solutions may be about 62.1% lithium bromide.

Referring to the drawing, there is shown an absorption refrigeration system comprising a generator 10, a refrigerant condenser 11, a high temperature adiabatic evaporator 12, a low temperature adiabatic evaporator 13, a high pressure absorber 14, a low pressure absorber 15, a sensible refrigerant heat exchanger 16 and an absorbent solution heat exchanger 17, connected to provide refrigeration. A purge unit 18 may be employed to remove relatively noncondensible vapors from the system.

Generator 10 comprises a boiler preferably having a shell 25, a plurality of internal flue tubes 26, a heat source such as gas burner 27, and a flue gas collector 28. Weak absorbent solution enters the generator and is boiled therein to concentrate the absorbent solution by vaporizing refrigerant. The concentrated or strong solution is discharged from the generator through strong solution passage 30. Other types of well-known boilers or generators employing either a combustible fuel, or a heating fluid, such as steam or water, may be employed for concentrating the absorbent solution.

The strong solution leaving the generator is preferably cooled by passing through the shell side passage of solution heat exchanger 17. In the preferred embodiment, a strong solution pump 31 is employed to pass the strong solution from heat exchanger 17 to the low pressure absorber 15. The use of a strong solution pump 31 allows generator 10 to be positioned at any convenient height relative to the other components of the system, although because of the pressure difference between generator 10 and low pressure absorber 15, the strong solution pump can be omitted, if desired.

Low pressure absorber 15 preferably comprises a plurality of vertically disposed finned absorber tubes 36, opening at their upper ends into a low pressure vapor header 35. Strong solution is discharged from strong solution passage 30 into a strong solution sump or other discharge means in vapor header 35 of low pressure absorber 15. The lower ends of absorber tubes 36 open into a low pressure liquid header 38. A fan 39 is preferably disposed adjacent absorber tubes 36 for passing ambient cooling air over the exterior surfaces of the absorber tubes to cool absorbent solution passing down through the tubes. While the preferred embodiment of this invention is directed to an air-cooled absorption refrigeration system, a liquid-cooled absorber employing cooling tower water for cooling the absorbent solution, may be used instead of the air-cooled arrangement illustrated.

The upper ends of absorber tubes 36 are shown projecting upwardly into vapor header 35 to form a weir for distributing the strong solution onto the interior walls of the absorber tubes. The strong solution passes downwardly through absorber tubes while being cooled by ambient air passing over the exterior surfaces of the tubes, thereby maintaining an optimumly low solution vapor pressure or saturation temperature. Refrigerant vapor from low temperature evaporator 13 enters the ends of absorber tubes 36 from vapor header 35 and passes downwardly therein, concurrently with the strong solution. This refrigerant vapor contacts the strong absorbent solution within absorber tubes 36, and is absorbed therein, thereby forming absorbent solution of intermediate strength.

The intermediate solution is collected in liquid header 38 from which it passes through a siphon tube 40 having an upwardly arched portion 41 and a downwardly extending leg 42. The upwardly arched portion 41 of siphon tube 40 opens into liquid header 38 and the downwardly extending leg 42 opens into liquid header 45 of high pressure absorber 14 below the level of liquid therein. Siphon tube 40 is dimensioned to form a liquid seal which balances the pressure difference between low pressure absorber 15 and high pressure absorber 14.

High pressure absorber 14 is similarly provided with a plurality of vertically disposed finned absorber tubes 46 having their upper ends opening into a high pressure vapor header 45 to establish a level of intermediate strength absorbent solution therein. The lower ends of the high pressure absorber tubes 46 open into high pressure liquid header 48. Intermediate strength absorbent solution from liquid header 45 together with refrigerant vapor from high temperature evaporator 12 flows downwardly through absorber tubes 46 while the absorbent solution is cooled therein by a fan 49 for passing ambient air over the exterior surfaces of the absorber tubes. Preferably, high pressure absorber tubes 46 are disposed vertically below and in the same plane with low pressure absorber tubes 36.

The absorption of refrigerant vapor into the intermediate solution passing downwardly through absorber tubes 46 dilutes the intermediate solution and the resulting weak solution is collected in liquid header 48. Weak solution passes out of liquid header 48 through siphon tube 50 having an upwardly arched portion 51 and a downwardly extending leg 52, which forms a liquid seal to prevent escape of refrigerant vapor from the high pressure absorber. Weak solution passes from siphon tube 50 through weak solution passage 60 into weak solution reservoir 61. Weak solution reservoir 61 may be formed integrally with liquid header 48 of high pressure absorber 14.

Weak solution from reservoir 61 is forwarded by weak solution pump 62 through weak solution passage 63 and the interior passage of solution heat exchanger 17, where it is warmed, back to generator 10 for reconcentration.

The refrigerant vapor formed by boiling weak solution passes out of the generator through refrigerant vapor line 65 into vapor header 70 of refrigerant condenser 11. Refrigerant condenser 11 preferably comprises a plurality of vertically disposed finned condenser tubes 71 opening upwardly into vapor header 70 and downwardly into liquid header 72. Cooling air is passed over the exterior surfaces of finned tubes 71 by a suitable fan. Preferably, the refrigeration system is enclosed in a casing and positioned with the condenser tubes in series in the path of the air flowing over the absorber tubes, so that a separate condenser fan is not required.

The refrigerant vapor is condensed within condenser tubes 71 by heat exchange with the air and the condensed refrigerant passes through the refrigerant liquid line 74 into the high temperature refrigerant evaporator 12.

High temperature adiabatic evaporator 12 may comprise a shell 80 from which a refrigerant vapor passage 86 extends to vapor header 45 of the high temperature absorber. A plurality of screens or other suitable packing material within shell 80 provide heat transfer for adiabatic evaporation of vaporized refrigerant liquid. In accordance with this invention, high temperature evaporator 12 and low temperature evaporator 13 are both of the adiabatic type wherein no heat is either added or removed from the refrigerant in the evaporator.

The warm refrigerant, upon entering high temperature evaporator 12, is adiabatically flash-cooled to the corresponding absorber pressure and saturation temperature.

Since no heat is added to the refrigerant in the evaporator, the adiabatic expansion of the refrigerant is a constant total enthalpy process. The unevaporated major portion of liquid refrigerant in adiabatic evaporator 12 is cooled due to the heat of evaporation which is absorbed from the liquid in vaporizing the small flashed portion of the refrigerant. In practice, a total of only about one percent of the refrigerant is evaporated in both evaporators 12 and 13 to cool the remaining refrigerant.

The cooled refrigerant liquid reaching the bottom of the high temperature adiabatic evaporator is discharged by gravity flow through cool refrigerant line 85, having a liquid trap 86, into low temperature adiabatic refrigerant evaporator 13. Low temperature evaporator 13 is physically disposed at a vertically lower elevation than high temperature evaporator 12 to enable gravity flow of liquid refrigerant from the high temperature evaporator to the low temperature evaporator without requiring a liquid sump. Trap 86 provides a liquid seal between the high temperature and low temperature adiabatic evaporators to prevent the passage of a substantial quantity of vapor between them and to maintain the pressure difference between the evaporator stages.

Low temperature adiabatic evaporator 13 operates at a significantly lower pressure and corresponding temperature than high pressure evaporator 12. The lower pressure in evaporator 13 is due to the fact that the average concentration of absorbent solution passing through absorber tubes 36 of low pressure absorber 15 is higher than the average concentration of absorbent solution passing through absorber tubes 46 of high pressure absorber 14. Because of the type of staging employed herein, the amount of dilution of the strong solution in absorber stage 15 is small. Thus, while both absorber stages may be cooled by ambient air of approximately the same temperature, the resulting vapor pressure of the absorbent solution in the low pressure absorber is lower than that in the high pressure absorber and much lower than in a single stage absorber. While the amount of absorbent dilution in each stage is small, the staging permits a wide overall concentration spread for good efficiency without sacrificing evaporator temperature.

Consequently, the cooled refrigerant discharged from the high temperature adiabatic evaporator 12 into the low pressure adiabatic evaporator 13 is again adiabatically flash-cooled to a still lower temperature. The cold refrigerant liquid reaching the bottom of low temperature adiabatic evaporator 13 is discharged by gravity flow through cold refrigerant liquid passage 95 into a suitable cold refrigerant reservoir 96, which is vertically below and may be integrally formed with the low temperature evaporator. While it is preferred to pass refrigerant condensate from condenser 11 to high temperature evapoator 12, because the amount of refrigerant condensate is only about one percent of the total circulated, it is possible to introduce the condensate directly into low temperature evaporator 13, if desired.

The cold liquid refrigerant is then pumped by a refrigerant pump 97 through refrigerant liquid line 98 into inlet header 101 of refrigerant heat exchanger 16. Refrigerant heat exchanger 16 comprises a sensible heat exchanger for cooling the desired refrigeration load, which, in the illustrated embodiment, is air passing by means of fan 103 through duct 104 in sensible heat exchange relation with the refrigerant passing through refrigerant heat exchanger 16. Preferably, air being cooled is passed throuh refrigerant heat exchanger 16 in counterflow with the refrigerant so that the coldest refrigerant cools the coldest air. Refrigerant heat exchanger may comprise a liquid to liquid heat exchanger for chilling water or other heat exchange medium instead of air if desired. The warmed liquid refrigerant, having absorbed heat from the refrigeration load, is discharged from outlet header 102 of refrigerant heat exchanger 16 and returns to the high temperature evaporator through warm refrigerant line 105.

By means of this invention, the use of an absorbent solution, such as lithium bromide, is rendered practical for an air-cooled absorption refrigeration system and previously encountered problems of insufficiently low vapor pressure, excessive temperature, solidification of highly concentrated absorbent solution, and low cycle efficiency are eliminated. This results is achieved by use of multiple stage-adiabatic evaporators in combination with a sensible refrigerant heat exchanger which prevents any dilution of refrigerant passing through the absorbers by unevaporated refrigerant, thereby enabling more effective use of the strong solution to provide a satisfactorily low vapor pressure. The passage of the strongest absorbent solution in the system to the absorber stage which receives vapor from the lowest temperature evaporator stage results in a lower vapor pressure of absorbent solution in the low pressure absorber, and a lower evaporator temperature, for a given concentration that can be achieved by single stage absorbers. Furthermore, the use of absorbers staged in the manner of this invention with adiabatic evaporators permits a wider total concentration spread and produces a higher coefficient of performance than is possible with prior systems using either nonadiabatic evaporators or a single stage absorber. The use of a sensible refrigerant heat exchanger for cooling the refrigeration load makes it possible to use the same heat exchanger for passing a liquid heating medium in heat exchange relation with the load being conditioned, if desired.

The preferred absorbent is lithium bromide and the preferred refrigerant is water, but other absorbent-refrigerant combinations, such as mixtures of hygroscopic halide salts or organic absorbent-refrigerant combinations may be employed by means of this invention, even though the use of such combinations has often been unacceptable in conventional absorption refrigeration systems.

For purposes of illustration, the system has been described as having a single high pressure absorber and evaporator stage and a single low pressure absorber and evaporator stage, but it will be appreciated that any number of stages may be employed in accordance with the principles of this invention. Still more satisfactory results may be achieved at the expense of some additional cost by the employment of three or more stages of absorption and evaporation having the stages arranged in accordance with this invention.

Accordingly, it will be understood that while a preferred embodiment of the invention has been described for purposes of illustration, the invention may be otherwise embodied within the scope of the following claims.

I claim:
1. An absorption refrigeration system comprising:
(A) a generator for concentrating absorbent solution by vaporizing refrigerant therefrom thereby forming strong absorbent solution;
(B) a condenser connected for condensing refrigerant vapor formed in said generator;
(C) a high temperature adiabatic evaporator for evaporating a portion of the refrigerant liquid while flash-cooling the remaining refrigerant liquid therein;
(D) a high pressure absorber connected to the high temperature evaporator for absorbing refrigerant vapor formed therein, said high pressure absorber comprising a heat exchanger placing absorbent solution in the absorber in heat transfer relation with a cooling medium to simultaneously cool the absorbent solution in the absorber while refrigerant vapor is being absorbed therein;
(E) a low temperature adiabatic evaporator for evaporating a portion of the refrigerant liquid while flash-cooling the remaining refrigerant liquid therein;
(F) a low pressure absorber connected to the low temperature evaporator for absorbing refrigerant vapor formed therein, said low pressure absorber comprising a heat exchanger placing absorbent solution in the absorber in heat transfer relation with a cooling medium to simultaneously cool the absorbent solution in the absorber while the refrigerant vapor is being absorbed therein;

(G) strong solution passage means for passing strong absorbent solution from said generator to said low pressure absorber for absorption of refrigerant vapor therein thereby forming intermediate strength absorbent solution;

(H) intermediate solution passage means for passing intermediate strength absorbent solution from said low pressure absorber to said high pressure absorber for absorption of refrigerant vapor therein;

(I) weak solution passage means for passing weak absorbent solution from said high pressure absorber to said generator for reconcentration therein;

(J) a refrigerant heat exchanger for passing cooled liquid refrigerant in heat exchange relation with a refrigeration load;

(K) cooled refrigerant liquid passage means for passing liquid refrigerant cooled in the high temperature evaporator to the low temperature evaporator for flash-cooling therein;

(L) cold refrigerant liquid passage means for passing cold refrigerant liquid from said low temperature evaporator to said refrigerant heat exchanger for cooling said refrigeration load thereby warming said refrigerant liquid;

(M) refrigerant liquid passage means for returning said warmed refrigerant liquid from said refrigerant heat exchanger to said high temperature evaporator for recooling therein and recirculation through said system; and (N) refrigerant liquid passage means for passing liquid refrigerant from the condenser to one of said evaporators for flash-cooling therein.

2. An absorption refrigeration system as defined in claim 1 wherein said refrigerant liquid passage means for passing refrigerant liquid from said condenser is connected to pass liquid refrigerant from said condenser to said high temperature evaporator.

3. An absorption refrigeration system as defined in claim 1 wherein said cooled refrigerant liquid passage comprises a liquid trap for passing cooled refrigerant from said high temperature adiabatic evaporator to said low temperature adiabatic evaporator while preventing passage of refrigerant vapor therebetween and for maintaining a pressure difference between said evaporators.

4. An absorption refrigeration system as defined in claim 1 including:
(A) said high pressure adiabatic evaporator is disposed at a vertically higher elevation than said low pressure adiabatic evaporator; and
(B) said cooled refrigerant liquid passage includes a refrigerant liquid seal for maintaining a pressure difference between said evaporators, while permitting gravity drainage of cooled refrigerant liquid from said high temperature adiabatic evaporator to said low temperature adiabatic evaporator.

5. An absorption refrigeration system as defined in claim 1 wherein:
(A) said low pressure absorber is disposed at a vertically higher elevation than said high pressure absorber; and
(B) said intermediate solution passage comprises a siphon tube for siphoning intermediate strength absorbent solution from said low pressure absorber to said high pressure absorber and for maintaining a pressure difference therebetween.

6. An absorption refrigeration system as defined in claim 1 including:
(A) said high pressure adiabatic evaporator is disposed at a vertically higher elevation than said low pressure adiabatic evaporator;
(B) said cooled refrigerant liquid passage includes a refrigerant liquid seal for preventing passage of refrigerant vapor from said high temperature adiabatic evaporator to said low temperature adiabatic evaporator and for maintaining a pressure difference between said evaporators, while permitting gravity drainage of cooled refrigerant liquids from said high temperature adiabatic evaporator to said low temperature adiabatic evaporator;
(C) said low pressure absorber is disposed at a vertically higher elevation than said low pressure absorber; and
(D) said intermediate solution passage includes a liquid seal between said low pressure absorber and said high pressure absorber for permitting gravity drainage of absorbent solution from said low pressure absorber to said high pressure absorber while maintaining a pressure difference therebetween.

7. An absorption refrigeration system as defined in claim 1 including means to pass air in heat exchange relation with absorbent solution in said high pressure absorber and said low pressure absorber for cooling absorbent solution in said absorbers.

8. An absorption refrigeration system as defined in claim 1 wherein said absorbent solution comprises an aqueous solution of a halide salt and said refrigerant comprises water.

9. An absorption refrigeration system as defined in claim 1 wherein said absorbent solution comprises lithium bromide; said refrigerant comprises water; and said system includes means for passing ambient air in heat exchange relation with absorbent solution in said high pressure absorber, said low pressure absorber, and said condenser to reject heat from said system.

10. An absorption refrigeration system as defined in claim 1 including a weak solution pump disposed in said weak solution passage for passing weak absorbent solution from said high pressure absorber to said generator, and a strong solution pump for passing strong absorbent solution from said generator to said low pressure absorber.

11. A method of producing refrigeration and operating an absorption refrigeration system having a generator, a condenser, a high pressure absorber, a low pressure absorber, a high temperature evaporator, a low temperature evaporator, and a refrigerant heat exchanger, which comprises the steps of:

(A) heating weak absorbent solution in the generator for vaporizing refrigerant therefrom and forming strong absorbent solution;

(B) passing strong absorbent solution from the generator through the low pressure absorber in heat exchange relation with a cooling medium to simultaneously cool the absorbent solution and to absorb refrigerant vapor formed in the low temperature evaporator, thereby forming intermediate strength absorbent solution;

(C) passing intermediate strength absorbent solution from the low pressure absorber through the high pressure absorber in heat exchanger relation with a cooling medium to simultaneously cool the absorbent solution and to absorb refrigerant vapor therein from the high temperature evaporator, thereby forming weak absorbent solution;

(D) passing weak absorbent solution from the high pressure absorber to the generator for reconcentration therein;

(E) condensing refrigerant vapor formed in the generator in the condenser to form liquid refrigerant;

(F) adiabatically flash-cooling refrigerant in the high temperature evaporator to form refrigerant vapor and cooled liquid refrigerant;

(G) passing cooled liquid refrigerant from the high temperature evaporator to the low temperature evaporator;

(H) adiabatically further flash-cooling said cooled liquid refrigerant in the low temperature evaporator to form refrigerant vapor and cold liquid refrigerant;

(I) passing cold liquid refrigerant from the low temperature evaporator through the refrigerant heat exchanger for absorbing heat from a refrigeration load, thereby warming the liquid refrigerant;

(J) passing the warmed liquid refrigerant from the refrigerant heat exchanger to the high temperature evaporator for cooling therein; and (K) passing liquid refrigerant from the condenser to the one of said evaporators.

12. A method of producing refrigeration as defined in claim 11 including the steps of passing air in heat exchange relation with absorbent solution in the high pressure absorber and the low pressure absorber for cooling absorbent solution therein and rejecting heat to said air; and passing air in heat exchange with refrigerant vapor in said condenser for condensing said refrigerant vapor.

13. A method of producing refrigeration as defined in claim 11 wherein the step of passing liquid refrigerant from said condenser to one of said evaporators comprises passing said liquid refrigerant from said condenser to said high temperature evaporator.

14. A method of providing refrigeration as defined in claim 11 including the step of draining cooled refrigerant from the high temperature evaporator to the low temperature evaporator by gravity.

15. A method of providing refrigeration as defined in claim 11 including the steps of:

(A) draining cooled refrigerant from the high temperature evaporator to the low temperature evaporator by gravity; and (B) draining intermediate strength absorbent solution from said low pressure absorber to said high pressure absorber by gravity.

References Cited

UNITED STATES PATENTS

| | | | |
|---|---|---|---|
| 3,126,720 | 3/1964 | Stubblefield | 62—476 X |
| 3,357,202 | 12/1967 | Holman et al. | 62—476 |
| 3,389,573 | 6/1968 | Papapanu et al. | 62—476 X |

LLOYD L. KING, Primary Examiner

U.S. Cl. X.R.

62—476